(12) United States Patent
Barreneche (10) Patent No.: US 11,214,047 B2
(45) Date of Patent: Jan. 4, 2022

(54) MULTI-LAYERED FILMS ORIENTED IN THE MACHINE DIRECTION AND ARTICLES COMPRISING THE SAME

(71) Applicant: Dow Global Technologies LLC, Midland, MI (US)

(72) Inventor: Felipe Martinez Barreneche, Houston, TX (US)

(73) Assignee: Dow Global Technologies LLC, Midland, MI (US)

(*) Notice: Subject to any disclaimer, the term of this patent is extended or adjusted under 35 U.S.C. 154(b) by 394 days.

(21) Appl. No.: 15/564,285

(22) PCT Filed: Jun. 22, 2016

(86) PCT No.: PCT/US2016/038603
§ 371 (c)(1),
(2) Date: Oct. 4, 2017

(87) PCT Pub. No.: WO2017/003773
PCT Pub. Date: Jan. 5, 2017

(65) Prior Publication Data
US 2018/0134018 A1 May 17, 2018

Related U.S. Application Data

(60) Provisional application No. 62/187,119, filed on Jun. 30, 2015.

(51) Int. Cl.
*B32B 27/32* (2006.01)
*B32B 27/08* (2006.01)
*C08L 23/06* (2006.01)

(52) U.S. Cl.
CPC ............ *B32B 27/327* (2013.01); *B32B 27/08* (2013.01); *B32B 27/32* (2013.01); *C08L 23/06* (2013.01);
(Continued)

(58) Field of Classification Search
CPC ....... B32B 27/327; B32B 27/32; B32B 27/08; B32B 2323/046; B32B 2439/70;
(Continued)

(56) References Cited

U.S. PATENT DOCUMENTS 3,645,992 A 2/1972 Dow
3,914,342 A 10/1975 Mitchell
(Continued)

FOREIGN PATENT DOCUMENTS

EP 1941998 A1 7/2008
EP 1941999 A1 7/2008
(Continued)

OTHER PUBLICATIONS

O.J. Myhre, Oriented PE Films, Expanding Opportunities with Borstar® PE, Maack Specialty Films, 2001, pp. 1-10.
(Continued)

*Primary Examiner* — Samir Shah (57) ABSTRACT

The present invention provides uniaxially oriented films and packages formed from such films. In one aspect, a uniaxially oriented film comprises (a) a first layer including (i) a first composition including an ethylene-based polymer prepared in the presence of a single-site catalyst, wherein the first composition has a density of 0.935 g/cm³ to 0.965 g/cm³, a melt index (I2) of 0.5 to 6 g/10 minutes, and a MWD of 6.0 or less, and (ii) a Ziegler-Natta catalyzed ultra low density polyethylene having a density of 0.880 g/cm³ to 0.912 g/cm³, a melt index (I2) of 0.5 to 6 g/10 minutes, and a MWD of 6.0 or less, (b) a second layer including at least one polyolefin, and (c) at least one inner layer between the first layer and the second layer including a high density polyethylene. The film is oriented in the machine direction at a draw ratio of between 4:1 and 10:1, and can exhibit a
(Continued)

machine direction 2% secant modulus of 85,000 psi or more when measured as per ASTM D882.

6 Claims, 3 Drawing Sheets

(52) U.S. Cl.
CPC ..... *B32B 2250/242* (2013.01); *B32B 2270/00* (2013.01); *B32B 2307/30* (2013.01); *B32B 2307/516* (2013.01); *B32B 2307/72* (2013.01); *B32B 2323/043* (2013.01); *B32B 2323/046* (2013.01); *B32B 2439/70* (2013.01); *B32B 2553/00* (2013.01); *C08L 2207/064* (2013.01); *C08L 2314/02* (2013.01); *C08L 2314/06* (2013.01)

(58) Field of Classification Search
CPC ........ B32B 2250/242; B32B 2307/516; B32B 2553/00; B32B 2323/043; B32B 2270/00; B32B 2307/72; B32B 2307/30; C08L 23/06; C08L 2314/02; C08L 2207/064; C08L 2314/06
See application file for complete search history.

(56) References Cited

U.S. PATENT DOCUMENTS

| | | |
|---|---|---|
| 4,076,698 A | 2/1978 | Anderson et al. |
| 4,599,392 A | 7/1986 | McKinney et al. |
| 5,089,321 A * | 2/1992 | Chum ................ B32B 27/32 428/218 |
| 5,272,236 A | 12/1993 | Lai et al. |
| 5,278,272 A | 1/1994 | Lai et al. |
| 5,582,923 A | 12/1996 | Kale et al. |
| 5,733,155 A | 3/1998 | Sagawa et al. |
| 5,854,045 A | 12/1998 | Fang et al. |
| 7,229,271 B2 * | 6/2007 | Merrill ................ B29C 55/08 425/325 |
| 2011/0252745 A1 * | 10/2011 | Breck ................ B32B 27/08 53/451 |
| 2013/0051710 A1 | 2/2013 | Borchardt et al. |
| 2014/0205823 A1 | 7/2014 | Yun et al. |

FOREIGN PATENT DOCUMENTS

| | | |
|---|---|---|
| EP | 2698251 A1 | 2/2014 |
| EP | 2875948 A1 | 5/2015 |
| WO | 2003064519 A1 | 8/2003 |
| WO | 2014026949 A1 | 2/2014 |

OTHER PUBLICATIONS

PCT/US2016/038603, International Preliminary Report on Patentability dated Jan. 2, 2018.
PCT/US2016/038603, International Search Report and Written Opinion dated Aug. 30, 2016.
R. Luijkx, Versatile polymer solutions for advanced multilayer structures in next-generation stand up pouches, Total, AMI Plastic Pouches, 2015, Vienna, AT, pp. 1-43.

* cited by examiner

MULTI-LAYERED FILMS ORIENTED IN THE MACHINE DIRECTION AND ARTICLES COMPRISING THE SAME

FIELD

The present invention relates to uniaxially oriented, multi-layered films and in particular, to multi-layered films oriented in the machine direction. Such films can be particularly useful in articles such as flexible packaging.

INTRODUCTION

Polyethylene films are widely used in flexible packaging, such as heavy duty shipping sacks, stand-up pouches, detergent pouches, sachets, etc. Depending on the application, a variety of properties may be needed in terms of integrity and/or attractiveness. Such properties can include: (1) excellent optical properties, such as high gloss, high clarity and low haze; (2) sufficient abuse resistance, such as high tensile strength, high puncture, stiffness and impact resistance; and/or (3) good sealing properties, such as low seal initiation temperature, broad sealing window, high seal strength and high hot tack.

Conventional blown or cast polyethylene films were widely used in flexible packaging, either as stand-alone packaging or lamination film. With market trends towards sustainability, flexible packaging continues to be down gauged. Polyethylene films used in packaging applications have been down gauged using different methods by film converters and others in search of thinner, tougher, stiffer and lower cost solutions to their needs and their customers' needs. For example, very tough linear low density polyethylene resins with fractional melt indices and stiff high density polyethylene resins have been used in blends or coextrusion combinations to make films that seek to balance stiffness and toughness. Likewise, blown film and cast film processes have been optimized to provide films that seek to balance optical properties with film gauge and toughness. However, there are limits on how thin the films can be without sacrificing toughness, tear strength, and/or stiffness required for conversion processes, bagging operations, and/or end use functional performance.

Biaxially oriented films (e.g., biaxially oriented polypropylene films and biaxially oriented polyethylene films) and cast polypropylene films have been found to provide good stiffness and toughness while down gauging in some instances.

Machine direction oriented (MDO) films are another approach to providing stiffness and optical properties to films. However, when oriented significantly in the machine direction (e.g., at draw ratios of 6:1 to 10:1), such films can become weak in tear strength in the machine direction due to the unidirectional orientation. As films are stretched at high ratios in the machine direction, the films are expected to more likely exhibit fibrillation in the machine direction and/or significant drops in tear strength in the machine direction.

It would thus be desirable to have new machine direction oriented films that provide significant down gauging while providing desirable mechanical properties.

SUMMARY

The present invention provides uniaxially oriented films comprising a plurality of layers with combinations of polyolefins that in some aspects, can be processed (e.g., oriented) more effectively and provide desirable mechanical properties. For example, in some aspects, films of the present invention exhibit limited drop in tear strength after orientation in the machine direction. As another example, in some aspects, films of the present invention can exhibit high 2% secant moduli values while maintaining desirable tear strength in the machine direction.

In one aspect, the present invention provides a uniaxially oriented film that comprises (a) a first layer comprising (i) a first composition comprising an ethylene-based polymer prepared in the presence of a single-site catalyst, wherein the first composition has a density of 0.935 g/cm$^3$ to 0.965 g/cm$^3$, a melt index ($I_2$) of 0.5 to 6 g/10 minutes, and a MWD of 6.0 or less, and (ii) a Ziegler-Natta catalyzed ultra low density polyethylene having a density of 0.880 g/cm$^3$ to 0.912 g/cm$^3$, a melt index ($I_2$) of 0.5 to 6 g/10 minutes, and a MWD of 6.0 or less; (b) a second layer comprising at least one polyolefin; and (c) at least one inner layer between the first layer and the second layer comprising a high density polyethylene, wherein the film is oriented in the machine direction at a draw ratio of between 4:1 and 10:1, and wherein the film exhibits a machine direction 2% secant modulus of 85,000 psi or more when measured as per ASTM D882.

In another aspect, the present invention provides a uniaxially oriented film that comprises (a) a first layer comprising (i) a first composition comprising an ethylene-based polymer prepared in the presence of a single-site catalyst, wherein the first composition has a density of 0.935 g/cm$^3$ to 0.965 g/cm$^3$, a melt index ($I_2$) of 0.5 to 6 g/10 minutes, and a MWD of 6.0 or less, and (ii) a Ziegler-Natta catalyzed ultra low density polyethylene having a density of 0.880 g/cm$^3$ to 0.912 g/cm$^3$, a melt index ($I_2$) of 0.5 to 6 g/10 minutes, and a MWD of 6.0 or less; (b) a second layer comprising at least one polyolefin; and (c) at least one inner layer between the first layer and the second layer comprising a Ziegler-Natta catalyzed ultra low density polyethylene having a density of 0.880 g/cm$^3$ to 0.912 g/cm$^3$ and a melt index ($I_2$) of 0.5 to 6 g/10 minutes, wherein the film is oriented in the machine direction at a draw ratio of between 4:1 and 10:1, and wherein the film exhibits a machine direction 2% secant modulus of 85,000 psi or more when measured as per ASTM D882.

Embodiments of the present invention also provide articles (e.g., flexible packages, pouches, stand-up pouches, etc.) formed from the films disclosed herein. Embodiments of the present invention also provide laminates comprising one or more of the films disclosed herein.

These and other embodiments are described in more detail in the Detailed Description.

DETAILED DESCRIPTION

Unless specified otherwise herein, percentages are weight percentages (wt %) and temperatures are in ° C.

The term "composition," as used herein, includes material(s) which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities may be incorporated into and/or within the polymer.

The term "interpolymer," as used herein, refers to a polymer prepared by the polymerization of at least two different types of monomers. The generic term interpolymer thus includes copolymers (employed to refer to polymers prepared from two different types of monomers), and polymers prepared from more than two different types of monomers. The term "polymer", as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers.

"Polyethylene" or "ethylene-based polymer" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE). These polyethylene materials are generally known in the art; however the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm$^3$.

The term "LLDPE", includes both resin made using the traditional Ziegler-Natta catalyst systems as well as single-site catalysts, including, but not limited to, bis-metallocene catalysts (sometimes referred to as "m-LLDPE") and constrained geometry catalysts, and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. Nos. 3,914,342 , 5,854,045). The LLDPEs can be made via gas-phase, solution-phase or slurry polymerization or any combination thereof, using any type of reactor or reactor configuration known in the art, with gas and slurry phase reactors being most preferred.

The term "MDPE" refers to polyethylenes having densities from 0.926 to 0.935 g/cm$^3$. "MDPE" is typically made using chromium or Ziegler-Natta catalysts or using single-site catalysts including, but not limited to, bis-metallocene catalysts and constrained geometry catalysts, and typically have a molecular weight distribution ("MWD") greater than 2.5.

The term "HDPE" refers to polyethylenes having densities greater than about 0.935 g/cm$^3$, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.912 g/cm$^3$, which are generally prepared with Ziegler-Natta catalysts, chrome catalysts, or single-site catalysts including, but not limited to, bis-metallocene catalysts and constrained geometry catalysts.

"Multimodal" means resin compositions which can be characterized by having at least two distinct peaks in a GPC chromatogram showing the molecular weight distribution. Multimodal includes resins having two peaks as well as resins having more than two peaks. Multimodal resins generally have a MWD (as defined herein) of greater than 6.0. Related thereto, multimodal resins also generally have $I_{10}/I_2$ values greater than 10. In contrast, the term "unimodal" refers to resin compositions which can be characterized by having one peak in a GPC chromatogram showing the molecular weight distribution. Unimodal resins generally have a MWD of 6.0 or less and $I_{10}/I_2$ values of 12 or less.

Certain polymers are characterized as being prepared in the presence of a "single-site catalyst" or as being "single-site catalyzed." Three major families of high efficiency single-site catalysts (SSC) have been commercially used for the preparation of polyethylene copolymers. These are bis-cyclopentadienyl single-site metallocene catalyst (also known as a Kaminsky catalyst), a half sandwich, constrained geometry mono-cyclopentadienyl single-site catalyst (known as a Constrained Geometry Catalyst, CGC, under the trademark of INSITE™ technology by The Dow Chemical Company), and post-metallocene catalysts. It should be understood that polymers characterized as being prepared in the presence of a single-site catalyst or as single-site catalyzed were prepared in the presence of one or more of such catalysts.

Unless otherwise indicated herein, the following analytical methods are used in the describing aspects of the present invention:

"Density" is determined in accordance with ASTM D792.

"Melt index": Melt indices $I_2$ (or I2) and $I_{10}$ (or I10) are measured in accordance with ASTM D-1238 at 190° C. and at 2.16 kg and 10 kg load, respectively. Their values are reported in g/10 min. "Melt flow rate" is used for polypropylene based resins and determined according to ASTM D1238 (230° C. at 2.16 kg).

"Peak melting point" is determined by a Differential Scanning calorimeter (DSC) where the film is conditioned at 230° C. for 3 minutes prior to cooling at a rate of 10° C. per minute to a temperature of −40° C. After the film is kept at −40° C. for 3 minutes, the film is heated to 200° C. at a rate of 10° C. per minute.

"VICAT softening point" is measured according to ASTM D 1525

"Percent crystallinity by weight" is calculated according to Equation 1:

$$\text{Crystallinity (wt. \%)} = \Delta H / \Delta H_o \times 100\%, \quad (\text{Eq. 1})$$

where the heat of fusion (ΔH) is divided by the heat of fusion for the perfect polymer crystal (ΔH$_o$) and then multiplied by 100%. For ethylene crystallinity, the heat of fusion for a perfect crystal is taken to be 290 J/g. For example, an ethylene-octene copolymer which upon melting of its polyethylene crystallinity is measured to have a heat of fusion of 29 J/g; the corresponding crystallinity is 10 wt %. For propylene crystallinity, the heat of fusion for a perfect crystal is taken to be 165 J/g. For example, a propylene-ethylene copolymer which upon melting of its propylene crystallinity is measured to have a heat of fusion of 20 J/g; the corresponding crystallinity is 12.1 wt %. "Heat of fusion" is obtained using a DSC thermogram obtained by model Q1000 DSC from TA Instruments, Inc. (New Castle, Del.). Polymer samples are pressed into a thin film at an initial temperature of 190° C. (designated as the "initial temperature"). About 5 to 8 mg of sample is weighed out and placed in the DSC pan. The lid is crimped on the pan to ensure a closed atmosphere. The DSC pan is placed in the DSC cell and then heated at a rate of about 100° C./minute to a temperature ($T_o$) of about 60° C. above the melt temperature of the sample. The sample is kept at this temperature for about 3 minutes. Then the sample is cooled at a rate of 10° C./minute to −40° C., and kept isothermally at that temperature for 3 minutes. The sample is then heated at a rate of 10° C./minute until complete melting. Enthalpy curves resulting from this experiment are analyzed for peak melt temperature, onset and peak crystallization temperatures, heat of fusion and heat of crystallization, and any other DSC analyses of interest.

The term molecular weight distribution or "MWD" is defined as the ratio of weight average molecular weight to number average molecular weight ($M_w/M_n$). $M_w$ and $M_n$ are determined according to methods known in the art using conventional gel permeation chromatography (GPC).

2% secant modulus is measured according to ASTM D882.

Elmendorf tear strength is measured according to ASTM D1922.

Additional properties and test methods are described further herein.

In one aspect, the present invention provides a uniaxially oriented film that comprises (a) a first layer comprising (i) a first composition comprising an ethylene-based polymer prepared in the presence of a single-site catalyst, wherein the first composition has a density of 0.935 g/cm$^3$ to 0.965 g/cm$^3$, a melt index ($I_2$) of 0.5 to 6 g/10 minutes, and a MWD of 6.0 or less, and (ii) a Ziegler-Natta catalyzed ultra low density polyethylene having a density of 0.880 g/cm$^3$ to 0.912 g/cm$^3$, a melt index ($I_2$) of 0.5 to 6 g/10 minutes, and a MWD of 6.0 or less; (b) a second layer comprising at least one polyolefin; and (c) at least one inner layer between the first layer and the second layer comprising a high density polyethylene, wherein the film is oriented in the machine direction at a draw ratio of between 4:1 and 10:1, and wherein the film exhibits a machine direction 2% secant modulus of 85,000 psi or more when measured as per ASTM D882. In some embodiments, the film can be oriented in the machine direction at a draw ratio of 5:1 to 9:1. In some embodiments, the first composition further comprises an ethylene-based polymer prepared in the presence of a Ziegler-Natta catalyst.

In another aspect, the present invention provides a uniaxially oriented film that comprises (a) a first layer comprising (i) a first composition comprising an ethylene-based polymer prepared in the presence of a single-site catalyst, wherein the first composition has a density of 0.935 g/cm$^3$ to 0.965 g/cm$^3$, a melt index ($I_2$) of 0.5 to 6 g/10 minutes, and a MWD of 6.0 or less, and (ii) a Ziegler-Natta catalyzed ultra low density polyethylene having a density of 0.880 g/cm$^3$ to 0.912 g/cm$^3$, a melt index ($I_2$) of 0.5 to 6 g/10 minutes, and a MWD of 6.0 or less; (b) a second layer comprising at least one polyolefin; and (c) at least one inner layer between the first layer and the second layer comprising a Ziegler-Natta catalyzed ultra low density polyethylene having a density of 0.880 g/cm$^3$ to 0.912 g/cm$^3$ and a melt index ($I_2$) of 0.5 to 6 g/10 minutes, wherein the film is oriented in the machine direction at a draw ratio of between 4:1 and 10:1, and wherein the film exhibits a machine direction 2% secant modulus of 85,000 psi or more when measured as per ASTM D882. In some embodiments, the film can be oriented in the machine direction at a draw ratio of 5:1 to 9:1. In some embodiments, the first composition further comprises an ethylene-based polymer prepared in the presence of a Ziegler-Natta catalyst. The at least one inner layer comprises 100% by weight of the Ziegler-Natta catalyzed ultra low density polyethylene in some embodiments. In other embodiments, the at least one inner layer further comprises a linear low density polyethylene having a density of 0.912 g/cm$^3$ to 0.935 g/cm$^3$ and a melt index ($I_2$) of 0.5 to 4 g/10 minutes in some embodiments. In some embodiments, the at least one inner layer further comprises a second composition comprising an ethylene-based polymer prepared in the presence of a single-site catalyst, wherein the second composition has a density of 0.935 g/cm$^3$ to 0.965 g/cm$^3$ and a melt index ($I_2$) of 0.5 to 6 g/10 minutes. In some such embodiments, the at least one inner layer comprises greater than 50% by weight of the Ziegler-Natta catalyzed ultra low density polyethylene and less than 50% by weight of the second composition. In some embodiments, the second composition further comprises an ethylene-based polymer prepared in the presence of a Ziegler-Natta catalyst.

In some embodiments, the first layer in the uniaxially oriented films comprises greater than 50% by weight of the first composition and less than 50% by weight of the Ziegler-Natta catalyzed ultra low density polyethylene. The ultra low density polyethylene in the first layer, in some embodiments, has a peak melting point of 100° C. or more.

In some embodiments, the ultra low density polyethylene in the first layer has a VICAT softening point of 100° C. or less.

The second layer, in various embodiments, can comprise at least one polyolefin. As set forth in more detail below, the at least one polyolefin in the second layer can comprise a variety of polyolefins or combinations of polyolefins in various embodiments.

With regard to the at least one inner layer, in some embodiments, the high density polyethylene is a Ziegler-Natta catalyzed high density polyethylene. In other embodiments, the high density polyethylene in the at least one inner layer is prepared in the presence of a single-site catalyst. In some embodiments, the high density polyethylene in the at least one inner layer is unimodal. In some embodiments, the at least one inner layer further comprises a linear low density polyethylene having a density of 0.912 g/cm$^3$ to 0.935 g/cm$^3$ and a melt index ($I_2$) of 0.5 to 6 g/10 minutes.

In some aspects, the first and/or second layers of the uniaxially oriented films can be outer layers. In some embodiments, uniaxially oriented films of the present invention have a thickness of 100 microns or less. In some embodiments, uniaxially oriented films of the present invention have a thickness of 10 microns or more. Uniaxially oriented films of the present invention can comprise more than 3 layers in some embodiments. For example, in some embodiments, uniaxially oriented films of the present invention can comprise up to nine layers.

Uniaxially oriented films of the present invention, in some embodiments, can exhibit one or more physical properties that may be desirable. In some embodiments, uniaxially oriented films of the present invention exhibit a normalized Elmendorf tear strength in the machine direction of 150 to 450 grams/mil when measured as per ASTM D1922. Films of the present invention, in some embodiments, exhibit a machine direction 2% secant modulus of 150,000 psi or more when measured as per ASTM D882. In some embodiments, the 2% secant modulus can be 200,000 psi or more. Uniaxially oriented films of the present invention, in some embodiments, can be substantially flat.

Embodiments of the present invention also provide articles formed from any of the uniaxially oriented films described herein. Examples of such articles can include flexible packages, pouches, stand-up pouches, and pre-made packages or pouches.

Some embodiments of the present invention comprise laminates formed from any uniaxially oriented films described herein. In some embodiments, two or more uniaxially oriented films as described herein are sealed to each other to form the laminate. In other embodiments, a laminate can be formed from a single blown film. In such embodiments, the inner surface of the blown film can collapse and seal on itself to form a laminate having a thickness approximately twice the thickness of the blown film prior to forming the laminate. In some embodiments, machine direction oriented laminates of the present invention can have a thickness of 20 to 100 microns, of 40 to 100 microns, or of 20 to 50 microns.

First Layer

In describing a first layer of a uniaxially oriented film of the present invention, it should be understood that the term "first" is used to identify the layer within the context of the other layers in the film. Nonetheless, in some embodiments, the first layer is an outer layer of the film.

In some embodiments, a first layer of the uniaxially oriented film comprises (i) a first composition comprising an ethylene-based polymer prepared in the presence of a single-site catalyst, wherein the first composition has a density of greater than 0.935 g/cm$^3$ to 0.965 g/cm$^3$, a melt index ($I_2$) of 0.5 to 6 g/10 minutes, and a MWD of 6.0 or less, and (ii) a Ziegler-Natta catalyzed ULDPE having a density of 0.880 g/cm$^3$ to 0.912 g/cm$^3$, a melt index ($I_2$) of 0.5 to 6 g/10 minutes, and a MWD of 6.0 or less.

In some embodiments, the ethylene-based polymer comprises a single-site catalyzed high density polyethylene. In some embodiments, in addition to the single-site catalyzed ethylene-based polymer, the composition further comprises an ethylene-based polymer prepared in the presence of a Ziegler-Natta catalyst.

The first composition has a density of than 0.935 g/cm$^3$ to 0.965 g/cm$^3$. All individual values and subranges from 0.935 g/cm$^3$ to 0.965 g/cm$^3$ are included herein and disclosed herein; for example, the density of the first composition can be from a lower limit of 0.935, 0.940, 0.945 or 0.950 g/cm$^3$ to an upper limit of 0.945, 0.950, 0.955, 0.960, or 0.965 g/cm$^3$. In some embodiments, the first composition has a density from 0.935 to 0.965 g/cm$^3$, preferably 0.945 to 0.962 g/cc, more preferably 0.950 to 0.960 g/cc.

In some embodiments, the first composition has a melt index ($I_2$) of up to 4.0 g/10 minutes. All individual values and subranges up to 6.0 g/10 minutes are included herein and disclosed herein. For example, the first composition can have a melt index to an upper limit of 1.0, 1.5, 2.0, 2.5, 3.0, 3.5, 4.0, 4.5, 5.0, 5.5, or 6.0 g/10 minutes. In a particular aspect of the invention, the first composition has an $I_2$ with a lower limit of 0.5 g/10 minutes. All individual values and subranges from 0.5 g/10 to 6.0 g/10 minutes are included herein and disclosed herein.

In some embodiments, the first composition is unimodal. In some embodiments, the first composition has a MWD of 6.0 or less, preferably 5.5 or less.

Examples of first compositions comprising an ethylene-based polymer prepared in the presence of a single-site catalyst that can be used in the first layer include those commercially available from The Dow Chemical Company under the name ELITE™ including, for example, ELITE™ 5960 and ELITE™ 5940.

As noted above, in embodiments where the first layer comprises a first composition comprising an ethylene-based polymer prepared in the presence of a single-site catalyst as described above, the first layer can further comprise a Ziegler-Natta catalyzed ULDPE. The Ziegler-Natta catalyzed ULDPE has a density of 0.880 g/cm$^3$ to 0.912 g/cm$^3$. All individual values and subranges from 0.880 g/cm$^3$ to 0.912 g/cm$^3$ are included herein and disclosed herein; for example, the density of the Ziegler-Natta catalyzed ULDPE can be from a lower limit of 0.880, 0.885, 0.890 or 0.895 g/cm$^3$ to an upper limit of 0.900, 0.905, 0.910, or 0.912 g/cm$^3$. In some embodiments, the Ziegler-Natta catalyzed ULDPE has a density from 0.890 to 0.912 g/cm$^3$, preferably 0.890 to 0.908 g/cc, more preferably 0.9 to 0.905 g/cc.

In some embodiments, the Ziegler-Natta catalyzed ULDPE has a melt index ($I_2$) of up to 6.0 g/10 minutes. All individual values and subranges up to 6.0 g/10 minutes are included herein and disclosed herein. For example, the Ziegler-Natta catalyzed ULDPE can have a melt index to an upper limit of 1.0, 1.5, 2.0, 2.5, 3.0 3.5, 4.0, 4.5, 5.0, 5.5, or 6.0 g/10 minutes. In a particular aspect of the invention, the Ziegler-Natta catalyzed ULDPE has an $I_2$ with a lower limit of 0.5 g/10 minutes. All individual values and subranges from 0.5 g/10 to 6.0 g/10 minutes are included herein and disclosed herein.

In some embodiments, the Ziegler-Natta catalyzed ULDPE is unimodal. In some embodiments, the Ziegler-Natta catalyzed ULDPE has a MWD of 6.0 or less, preferably 5.5 or less.

Examples of Ziegler-Natta catalyzed ULDPEs that can be used in the first layer include those commercially available from The Dow Chemical Company under the names ATTANE™ and FLEXOMER™ (a VLDPE) including, for example, ATTANE™ 4203, ATTANE™ 4201, ATTANE™ NG 4701, ATTANE™ SL 4101, FLEXOMER™ ETS-9064, FLEXOMER™ ETS-9066, and FLEXOMER™ DFDA 1137.

In some embodiments wherein the first layer comprises a first composition comprising an ethylene-based polymer prepared in the presence of a single-site catalyst as described above and a Ziegler-Natta catalyzed ULDPE, the first layer can comprise greater than 50% by weight of the first composition and less than 50% by weight of the Ziegler-Natta catalyzed ULDPE, preferably greater than 60% by weight of the first composition and less than 40% by weight of the Ziegler-Natta catalyzed ULDPE, or greater than 65% by weight of the first composition and less than 35% by weight of the Ziegler-Natta catalyzed ULDPE.

In embodiments of the present invention incorporating a Ziegler-Natta catalyzed ULDPE in the first layer, the Ziegler-Natta catalyzed ULDPE preferably has a difference between its VICAT softening point and its peak melting point of at least 30° C., preferably at least 40° C. This provides a very broad orientation window for orientation which is believed to provide significant stress relaxation and annealing after orienting for improved toughness, tear strength, and/or optics. In some embodiments, the Ziegler-Natta catalyzed ULDPE preferably has a peak melting point of 110° C. or more and/or a VICAT softening point of 90° C. or less.

Second Layer

In describing a second layer of a uniaxially oriented film of the present invention, it should be understood that the term "second" is used to identify the layer within the context of the other layers in the film. In some embodiments, the second layer is an outer layer of the film. In other embodiments, the second layer is an interior layer, with at least one inner layer being between the first layer and the second layer. For example, in some embodiments, such as a blown film, the film can be blown with the second layer being an inner surface layer, but then allowed to collapse on itself such that an A/B/C structured blown film becomes an A/B/C/C/B/A structured film with A being the first layer, C being the second layer, and B being the inner layer.

In some embodiments, a second layer of the uniaxially oriented film comprises a polyolefin. A variety of polyolefins and combinations of polyolefins can be incorporated into the second layer in various embodiments.

In some embodiments, the second layer can have the same composition as the first layer. Thus, in some such embodiments, when the first layer comprises (i) a first composition comprising an ethylene-based polymer prepared in the presence of a single-site catalyst as described above, and (ii) a Ziegler-Natta catalyzed ULDPE having a density of 0.880 g/cm$^3$ to 0.912 g/cm$^3$ and a melt index (I$_2$) of 0.5 to 6 g/10 minutes, the second layer comprises two polyolefins: (i) a second composition comprising an ethylene-based polymer prepared in the presence of a single-site catalyst, wherein the second composition has a density of 0.935 g/cm$^3$ to 0.965 g/cm$^3$ and a melt index (I$_2$) of 0.5 to 6 g/10 minutes, and (ii) a Ziegler-Natta catalyzed ULDPE having a density of 0.880 g/cm$^3$ to 0.912 g/cm$^3$ and a melt index (I$_2$) of 0.5 to 6 g/10 minutes. The second composition can include any of the first compositions that are described above in connection with the first layer. Likewise, the Ziegler-Natta catalyzed ULDPE can include any of the Ziegler-Natta catalyzed ULDPEs that are described above in connection with the first layer. The relative amounts of the second composition and the Ziegler-Natta catalyzed ULDPE can likewise be the same as the relative amounts described above in connection with the first layer.

In some embodiments, the at least one polyolefin in the second layer comprises a Ziegler-Natta catalyzed ULDPE having a density of 0.880 g/cm$^3$ to 0.912 g/cm$^3$ and a melt index (I$_2$) of 0.5 to 6.0 g/10 minutes, and a metallocene catalyzed LLDPE having a density of 0.912 g/cm$^3$ to 0.935 g/cm$^3$ and a melt index (I$_2$) of 0.5 to 6.0 g/10 minutes. The Ziegler-Natta catalyzed ULDPE can include any of the Ziegler-Natta catalyzed ULDPEs that are described above in connection with the first layer. Likewise, the metallocene catalyzed LLDPE can include any of the metallocene catalyzed LLDPEs that are described above in connection with the first layer. In some embodiments, wherein the second layer comprises a Ziegler-Natta catalyzed ULDPE and a metallocene catalyzed LLDPE, the second layer can comprise greater than 45% by weight of the Ziegler-Natta catalyzed ULDPE and less than 55% by weight of the metallocene catalyzed LLDPE, preferably greater than 60% by weight of the Ziegler-Natta catalyzed ULDPE and less than 40% by weight of the metallocene catalyzed LLDPE, or greater than 65% by weight of the Ziegler-Natta catalyzed ULDPE and less than 35% by weight of the metallocene catalyzed LLDPE.

The at least one polyolefin in the second layer, in some embodiments, comprises a Ziegler-Natta catalyzed ULDPE having a density of 0.880 g/cm$^3$ to 0.912 g/cm$^3$ and a melt index (I$_2$) of 0.5 to 6.0 g/10 minutes, and a polyolefin plastomer. In some such embodiments, the polyolefin plastomer has a density of 0.865 to 0.908 g/cm$^3$ and a melt index (I$_2$) of 0.5-6 g/10 minutes, and the polyolefin plastomer comprises a polyethylene plastomer, a polypropylene plastomer, or combinations thereof. The Ziegler-Natta catalyzed ULDPE can include any of the Ziegler-Natta catalyzed ULDPEs that are described above in connection with the first layer. Likewise, the polyolefin plastomer can include any of the polyolefin plastomers that are described above in connection with the first layer. In some embodiments, wherein the second layer comprises a Ziegler-Natta catalyzed ULDPE and a polyolefin plastomer, the second layer can comprise greater than 50% by weight of the polyolefin plastomer and less than 50% by weight of the Ziegler-Natta catalyzed ULDPE, preferably greater than 55% by weight of the polyolefin plastomer and less than 45% by weight of the Ziegler-Natta catalyzed ULDPE, or greater than 35% by weight of the polyolefin plastomer and less than 65% by weight of the Ziegler-Natta catalyzed ULDPE.

The at least one polyolefin in the second layer, in some embodiments, comprises a metallocene catalyzed LLDPE having a density of 0.912 g/cm$^3$ to 0.935 g/cm$^3$ and a melt index (I$_2$) of 0.5 to 6 g/10 minutes, and a polyolefin plastomer. In some such embodiments, the polyolefin plastomer has a density of 0.865 to 0.908 g/cm$^3$ and a melt index (I$_2$) of 0.5-6 g/10 minutes, and the polyolefin plastomer comprises a polyethylene plastomer, a polypropylene plastomer, or combinations thereof. The metallocene catalyzed LLDPE can include any of the metallocene catalyzed LLDPEs that are described above in connection with the first layer. Likewise, the polyolefin plastomer can include any of the polyolefin plastomers that are described above in connection with the first layer. In some embodiments, wherein the second layer comprises a metallocene catalyzed LLDPE and a polyolefin plastomer, the second layer can comprise greater than 45% by weight of the metallocene catalyzed LLDPE and less than 55% by weight of the polyolefin plastomer, preferably greater than 40% by weight of the metallocene catalyzed LLDPE and less than 60% by weight of the polyolefin plastomer, or greater than 35% by weight of the metallocene catalyzed LLDPE and less than 65% by weight of the polyolefin plastomer.

In some embodiments, the at least one polyolefin in the second layer comprises 100% by weight of a Ziegler-Natta catalyzed ULDPE having a density of 0.880 g/cm$^3$ to 0.912 g/cm$^3$ and a melt index ($I_2$) of 0.5 to 6.0 g/10 minutes. The Ziegler-Natta catalyzed ULDPE can include any of the Ziegler-Natta catalyzed ULDPEs that are described above in connection with the first layer.

The at least one polyolefin in the second layer, in some embodiments, comprises 100% by weight of a metallocene catalyzed LLDPE having a density of 0.912 g/cm$^3$ to 0.935 g/cm$^3$ and a melt index ($I_2$) of 0.5 to 6.0 g/10 minutes. The metallocene catalyzed LLDPE can include any of the metallocene catalyzed LLDPEs that are described above in connection with the first layer.

In some embodiments, the at least one polyolefin in the second layer comprises 100% by weight of a polyolefin plastomer having a density of 0865 g/cm$^3$ to 0.908 g/cm$^3$ and a melt index ($I_2$) of 0.5 to 6 g/10 minutes. In some such embodiments, the polyolefin plastomer comprises a polyethylene plastomer, a polypropylene plastomer, or combinations thereof. The polyolefin plastomer can include any of the polyolefin plastomers that are described above in connection with the first layer.

Inner Layer

The uniaxially oriented films of the present invention each comprise at least one inner layer. The term "inner" is used to indicate that the inner layer is between the first layer and the second layer. The term "at least one inner layer" is used to indicate that uniaxially oriented films of the present invention can include a single inner layer or multiple inner layers. In some embodiments comprising two or more inner layers, each of the inner layers can have the same composition. In other embodiments comprising two or more inner layers, each of the inner layers can have different compositions, or only some of the inner layers can have the same composition.

With regard to the at least one inner layer, in some embodiments, wherein the first layer comprises a (i) a first composition comprising an ethylene-based polymer prepared in the presence of a single-site catalyst as described above, and (ii) a Ziegler-Natta catalyzed ULDPE, and wherein the second layer comprises at least one polyolefin, the at least one inner layer can comprise a HDPE. In some embodiments, the HDPE can be a unimodal HDPE. In some embodiments, the HDPE can have a MWD of 6.0 or less. The HDPE can be a Ziegler-Natta catalyzed HDPE in some embodiments and a single-site catalyzed HDPE in other embodiments. In some embodiments, the at least one inner lay can comprise the first composition comprising an ethylene-based polymer prepared in the presence of a single-site catalyst, wherein the first composition has a density of greater than 0.935 g/cm$^3$ to 0.965 g/cm$^3$ and a melt index ($I_2$) of 0.5 to 6 g/10 minutes, as described above in connection with the first layer. For example, the single-site catalyzed HDPE can include any of those described above in connection with the first layer.

When the HDPE comprises a unimodal, Ziegler-Natta catalyzed HDPE, the HDPE has a density of 0.935 g/cm$^3$ to 0.965 g/cm$^3$. All individual values and subranges from 0.935 g/cm$^3$ to 0.965 g/cm$^3$ are included herein and disclosed herein; for example, the density of the Ziegler-Natta catalyzed HDPE can be from a lower limit of 0.935, 0.940, 0.945 or 0.950 g/cm$^3$ to an upper limit of 0.945, 0.950, 0.955, 0.960, or 0.965 g/cm$^3$. In some embodiments, the Ziegler-Natta catalyzed HDPE has a density from 0.935 to 0.965 g/cm$^3$, preferably 0.945 to 0.962 g/cc, more preferably 0.950 to 0.960 g/cc. In some embodiments, the Ziegler-Natta catalyzed HDPE has a melt index ($I_2$) of up to 6.0 g/10 minutes. All individual values and subranges up to 6.0 g/10 minutes are included herein and disclosed herein. For example, the Ziegler-Natta catalyzed HDPE can have a melt index to an upper limit of 1.0, 1.5, 2.0, 2.5, 3.0, 3.5, 4.0, 4.5, 5.0, 5.5, or 6.0 or g/10 minutes. In a particular aspect of the invention, the Ziegler-Natta catalyzed HDPE has an $I_2$ with a lower limit of 0.2 g/10 minutes. All individual values and subranges from 0.2 g/10 to 6.0 g/10 minutes are included herein and disclosed herein. In some embodiments, the Ziegler-Natta catalyzed HDPE is unimodal. In some embodiments, the Ziegler-Natta catalyzed HDPE has a MWD of 6.0 or less, preferably 5.5 or less. Examples of Ziegler-Natta catalyzed HDPEs that can be used in the inner layer include those commercially available from The Dow Chemical Company under the names DGDA 6200 and DGDA 6400.

In some embodiments wherein the at least one inner layer comprises a HDPE (either single-site catalyzed or Ziegler-Natta catalyzed), the at least one inner layer can further comprise a LLDPE having a density of 0.912 g/cm$^3$ to 0.935 g/cm$^3$ and a melt index ($I_2$) of 0.5 to 6.0 g/10 minutes. The LLDPE can be any of those disclosed in connection with the first layer above.

Turning to other embodiments wherein the first layer comprises a (i) a first composition comprising an ethylene-based polymer prepared in the presence of a single-site catalyst as described above and (ii) a Ziegler-Natta catalyzed ULDPE, and wherein the second layer comprises at least one polyolefin, the at least one inner layer can comprise a Ziegler-Natta catalyzed ULDPE having a density of 0.880 g/cm$^3$ to 0.912 g/cm$^3$ and a melt index ($I_2$) of 0.5 to 6.0 g/10 minutes. The Ziegler-Natta catalyzed ULDPE can be any of those disclosed above in connection with the first layer. In some embodiments, the ULDPE can be blended with a LLDPE or with a single-site catalyzed HDPE. Such single-site catalyzed HDPEs can include any of those disclosed above in connection with the first layer including any of the first compositions. The LLDPE can be a metallocene catalyzed LLDPE or a Ziegler-Natta catalyzed LLDPE. A metallocene catalyzed LLDPE can be any of those disclosed in connection with the first layer above. The Ziegler-Natta catalyzed LLDPE has a density of 0.912 g/cm$^3$ to 0.935 g/cm$^3$. All individual values and subranges from 0.912 g/cm$^3$ to 0.935 g/cm$^3$ are included herein and disclosed herein; for example, the density of the Ziegler-Natta catalyzed LLDPE can be from a lower limit of 0.912, 0.915, 0.920, or 0.925 g/cm$^3$ to an upper limit of 0.920, 0.925, 0.930, or 0.935 g/cm$^3$. In some embodiments, the Ziegler-Natta catalyzed LLDPE has a density from 0.915 to 0.935 g/cm$^3$, preferably 0.916 to 0.926 g/cc, more preferably 0.917 to 0.924 g/cc. In some embodiments, the Ziegler-Natta catalyzed LLDPE has a melt index ($I_2$) of up to 4.0 g/10 minutes. All individual values and subranges up to 4.0 g/10 minutes are included herein and disclosed herein. For example, the Ziegler-Natta catalyzed LLDPE can have a melt index to an upper limit of 1.0, 1.5, 2.0, 2.5, 3.0, 3.5, 4.0, 4.5, 5.0, 5.5, or 6.0 g/10 minutes. In a particular aspect of the invention, the Ziegler-Natta catalyzed LLDPE has an $I_2$ with a lower limit of 0.2 g/10 minutes. All individual values and subranges from 0.2 g/10 to 6.0 g/10 minutes are included herein and disclosed herein. Examples of Ziegler-Natta catalyzed LLDPEs that can be used include those commercially available from The Dow Chemical Company under the name DOWLEX™ including, for example, DOWLEX™ 2045 and DOWLEX™ 2038.68.

When the Ziegler-Natta catalyzed ULDPE is blended with a single-site catalyzed HDPE or a LLDPE, the at least one inner layer can comprise greater than 50% by weight of the Ziegler-Natta catalyzed ULDPE and less than 50% by weight of the single-site catalyzed HDPE or the LLDPE, preferably greater than 60% by weight of the Ziegler-Natta catalyzed ULDPE and less than 40% by weight of the single-site catalyzed HDPE or the LLDPE, or greater than 65% by weight of the Ziegler-Natta catalyzed ULDPE and less than 35% by weight of the LLDPE.

It should be understood that any of the foregoing layers can further comprise one or more additives as known to those of skill in the art such as, for example, antioxidants, ultraviolet light stabilizers, thermal stabilizers, slip agents, antiblock, pigments or colorants, processing aids, crosslinking catalysts, flame retardants, fillers and foaming agents.

Films

A variety of multilayer films can be formed in accordance with the teachings of the present invention. Certain combinations of resins may provide films having certain desirable properties. The multilayer films can have particularly desirable properties when oriented only in the machine direction to provide uniaxially oriented films of the present invention.

A multilayer film can be formed according to any method known in the art. The combinations of resins described herein may be particularly well-suited for formation of multilayer films using blown film processes. When a blown film process is used, the blown film can be formed conventionally (e.g., slit and opened prior to winding), or the blown film can be allowed to collapse so that the interior layer (the second layer as described herein) can laminate to itself to form a multilayer film that is twice as thick. In other words, a blown film process can be configured to form an A/B/C multilayer film, with A corresponding to a first layer, C corresponding to a second layer, and B corresponding to an inner layer between A and C (if the first and second layer are the same composition, the film might also be characterized as an A/B/A film). In a typical process, the multilayer film would have an A/B/C structure. However, if the film were allowed to collapse on itself, the multilayer film would have an A/B/C/C/B/A structure. In either scenario, the multilayer film can later be oriented in the machine direction to provide a uniaxially oriented film of the present invention.

The collapsing method may be desirable in certain situations such as when thicker films are desired. The collapsing method, in some embodiments, can also be advantageous as it facilitates the manufacture of symmetric films oriented in the machine direction without curling. The collapsing method, in some embodiments, can also allow for faster cooling as some cooling of the thinner film occurs prior to collapsing into the thicker film. Another advantage of the collapsing method is that it can provide enhanced barrier properties as a barrier layer (e.g., an oxygen barrier layer or water vapor barrier layer) can be included in the blown film, and then duplicated when the blown film collapses (e.g., a single barrier layer in the blown film becomes two barrier layers upon collapse).

The number of layers in uniaxially oriented films can depend on a number of factors including, for example, the desired properties of the film, the end use application for the film, the desired polymers to be used in each layer, the desired thickness of the film, whether the film is formed by collapsing a blown film, and others. Uniaxially oriented films of the present invention comprise at least three layers. Typical films made with or without collapsing can have up to 9 layers, though collapsing a multilayer blown film can result in more layers (e.g., a 9 layer blown film collapses to form 18 layers). Structures could be, for example, A/B/A (if the outer layers have the same composition), A/B/C, A/B/C/A, A/B/C/D, A/B/C/D/E, A/B/C/D/E/F, A/B/C/D/E/F/G, A/B/C/D/D/C/B/A, A/B/C/D/E/F/G/H, A/B/C/D/E/F/G/H/I, and others. The structures described herein can be used to make films with thicknesses of up to 200 or 250 microns in a non-collapsed configuration of 3, 5, 7, or 9 layers. A primary limiting factor as to the thickness of the film is the ability to cool such thick films and to make stable bubbles while maintaining a reasonable gauge variation (e.g., +/−10%).

By collapsing the film and allowing an interior layer to laminate to itself, much thicker films can be made (e.g., a 250 micron film becomes 500 microns). Thus, some embodiments relate to blown films that are collapsed to form a thicker film. If such structures are allowed to collapse such that the interior layer collapses on itself, the structures could be, for example, A/B/C/C/B/A, A/B/C/D/D/C/B/A, A/B/C/D/E/E/D/C/B/A, A/B/C/D/E/F/G/G/F/E/D/C/B/A, and others. In embodiments where collapsing is desired, the composition of the second layer (as described above, not the second layer in the film structure itself), can be selected so as to facilitate its lamination to itself during the blown film process.

Forming the blown film using a collapsing method can provide several advantages. As indicated above, a blown film can be made that doubles in thickness upon collapsing (e.g., a 50 micron blown film collapses to make a 100 micron film; a 100 micron blown film collapses to make a 200 micron film). Thus, the collapsing method allows one to initially make (i.e., prior to collapsing) relatively thinner and symmetrically blown films with better cooling efficiency, lower film crystallinity and better optics compared to a non-collapsed film having a thickness comparable to the film after collapsing. The collapsing method also advantageously provides, in some embodiments, substantially flat films after collapsing. The ability to make very thick films (e.g., up to 400 or 500 microns in some embodiments) can provides advantage when the film is then oriented in the machine direction. For example, a 400 or 500 micron film can be oriented in the machine direction at a stretch ratio of 4:1 or 5:1 to provide a 100 micron film for heavy duty bag applications. Or, such a film could oriented in the machine direction at a stretch ratio of up to 10:1 to provide a very stiff fill of 40-50 microns which might be used in tape or label applications.

While forming thicker films by allowing a blown film to collapse on itself, other embodiments relate to films formed by later laminating two or more existing films to one another. For example, two or more films having the same structure can be prepared using a cast film process and then laminated to simulate the symmetric collapsed structures described above. The two films can each have a contact layer with a relatively low melting point such that the films can pass over a hot roll that heats the films and thermally laminates them together. The two films also could be laminated together with an adhesive. When the two films having the same structure are laminated together, the laminated film can simulate what occurs when a blown film is collapsed.

Once formed, multilayer films are then oriented in the machine direction only so as to provide uniaxially oriented films of the present invention. The film web can be oriented in the machine direction only using techniques known to those of skill in the art, such as a tenter frame process. The film can be oriented at a draw ratio of 4:1 to 10:1 in embodiments of the present invention. In some embodiments, the film can be oriented at a draw ratio of 5:1 to 9:1. The draw ratio will impact the thickness of the uniaxially oriented film, in addition to the original thickness and whether the film is collapsed. For example, a multilayer film having an initial thickness of 200 microns, can be collapsed to a thickness of 400 microns, and then oriented in the machine direction to thicknesses of 40 microns (with a draw ratio of 10:1), of 50 microns (with a draw ratio of 8:1), of 100 microns (with a draw ratio of 4:1), or others. As another example, a multilayer film having an initial thickness of 125 microns, can be collapsed to a thickness of 250 microns, and then oriented in the machine direction to thicknesses of 25 microns (with a draw ratio of 10:1), of 50 microns (with a draw ratio of 5:1), or others. As another example, a multilayer film having an initial thickness of 100 microns, can be collapsed to a thickness of 200 microns, and then oriented in the machine direction to thicknesses of 20 microns (with a draw ratio of 10:1), of 40 microns (with a draw ratio of 5:1), or others. Thus, uniaxially oriented films of the present invention can permit a significant amount of orientation in the machine direct while still maintaining a significant range of potential film thicknesses.

This amount of orientation combined with the composition of the different layers in the film as described herein can provide uniaxially oriented films having one or more desirable properties. In some embodiments, uniaxially oriented films of the present invention can exhibit a machine direction 2% secant modulus of 75,000 psi or more when measured as per ASTM D882. Uniaxially oriented films, in some embodiments of the present invention, can exhibit a machine direction 2% secant modulus of 100,000 psi or more when measured as per ASTM D882. Uniaxially oriented films of the present invention can exhibit a machine direction 2% secant modulus of 150,000 psi or more when measured as per ASTM D882 in some embodiments. Uniaxially oriented films, in some embodiments, of the present invention can exhibit a machine direction 2% secant modulus of 200,000 psi or more when measured as per ASTM D882.

Uniaxially oriented films of the present invention can also exhibit desirable tear strength values. In some embodiments, uniaxially oriented films of the present invention exhibit a normalized Elmendorf tear strength in the machine direction of 150 to 450 grams/mil when measured as per ASTM D1922. In some embodiments, films of the present invention can exhibit a limited drop in tear strength in the machine direction even after orientation only in the machine direction at draw ratios of greater than 5:1, greater than 6:1, and even up to 9:1.

Uniaxially oriented films of the present invention, in some embodiments, also exhibit high 2% secant modulus in the machine direction (e.g., >150,000 psi at a 6:1 draw ratio; >200,000 psi at a 8:1 draw ratio, and >250,000 psi at a 9:1 draw ratio) while maintaining relatively high normalized Elmendorf tear strength values (e.g., >200 g/mil).

In some embodiments, uniaxially oriented films of the present invention are substantially flat. In some embodiments, uniaxially oriented films of the present invention have a gauge variation that is within 5% of the average gauge of the film.

Various embodiments of the present invention contemplate different combinations of resins in different layers of the uniaxially oriented films to provide certain properties. For example, in embodiments where high stiffness but low tear resistance is desired, the film might incorporate relatively high levels of HDPE. For a non-collapsed film, a uniaxially oriented film having an A/B/A structure may comprise A layers (the first and second layer) having 70% by weight of the layer of a first composition comprising an ethylene-based polymer prepared in the presence of a single-site catalyst having a density of 0.935 to 0.965 g/cm$^3$ and 30% by weight of the layer of a Ziegler-Natta catalyzed ULDPE, and a B layer (an inner layer) comprising 100% of a second composition comprising an ethylene-based polymer prepared in the presence of a single-site catalyst (e.g., a single-site catalyzed HDPE). The first composition, the second composition, and the Ziegler-Natta catalyzed ULDPE can be any of those disclosed above in connection with the descriptions of the corresponding layers. In this structure, the high density compositions are believed to provide high stiffness with low tear strength, while the inclusion of ULDPE is believed to provide surface tackiness to help the film stick to the rolls during orientation and to prevent neck-in in the cross direction during high machine direction orientation. For a collapsed film where high stiffness but low tear resistance is desired, a uniaxially oriented film having an A/B/C/C/B/A structure may comprise the same A layer (the first layer), the same B layer (an inner layer between the first layer and second layer), and a C layer (a second layer) comprising 100% by weight of a Ziegler-Natta catalyzed ULDPE. The Ziegler-Natta catalyzed ULDPE can be any of those disclosed above in connection with the descriptions of the corresponding layers. In this structure, the ULDPE in the C layer can be a relatively thin layer to provide adhesion during collapsing of the film without significantly increasing tear resistance.

As another example, some embodiments relate to uniaxially oriented films that combine high stiffness with high tear resistance. For a non-collapsed film, a uniaxially oriented film having an A/B/A structure may comprise A layers (the first and second layer) having 70% by weight of the layer of a first composition comprising an ethylene-based polymer prepared in the presence of a single-site catalyst having a density of 0.935 to 0.965 g/cm$^3$ and 30% by weight of the layer of a Ziegler-Natta catalyzed ULDPE, and a B layer (an inner layer) comprising either 100% of a Ziegler-Natta catalyzed ULDPE or blends of such a ULDPE with a LLDPE. The first composition, the Ziegler-Natta catalyzed ULDPEs, and any LLDPE can be any of those disclosed above in connection with the descriptions of the corresponding layers. In this structure, the high density first composition in the A layers (the first and second layers) is believed to provide high stiffness with low tear strength, while the inclusion of ULDPE in the A layers (the first and second layers) is believed to provide surface tackiness to help the film stick to the rolls during orientation and to prevent neck-in in the cross direction during high machine direction orientation. The ULDPE or combination of ULDPE and LLDPE in the B layer (the inner layer) is believed to provide high tear resistance. For a collapsed film having a combination of high stiffness and high tear resistance, a uniaxially oriented film having an A/B/C/C/B/A structure may comprise the same A layer (the first layer). The B layer (an inner layer between the first layer and second layer) can comprise 70% by weight of the layer of a Ziegler-Natta catalyzed ULDPE, and a C layer (a second layer) comprising 100% by weight of a Ziegler-Natta catalyzed ULDPE. The Ziegler-Natta catalyzed ULDPEs can be any of those disclosed above in connection with the descriptions of the corresponding layers. In this structure, the HDPE/ULDPE combination in the B layer is believed to provide high tear resistance with toughness, and the ULDPE in the C layer also provides high tear resistance and toughness while also providing adhesion during collapsing of the film.

As another example, some embodiments relate to uniaxially oriented films that combine high stiffness with high tear resistance. For a non-collapsed film, a uniaxially oriented film having an A/B/A structure may comprise A layers (the first and second layer) having 70% by weight of the layer of a first composition comprising an ethylene-based polymer prepared in the presence of a single-site catalyst having a density of 0.935 to 0.965 $g/cm^3$ and 30% by weight of the layer of a Ziegler-Natta catalyzed ULDPE, and a B layer (an inner layer) comprising either 100% of a Ziegler-Natta catalyzed ULDPE or blends of such a ULDPE with a LLDPE. The metallocene catalyzed HDPE, the Ziegler-Natta catalyzed ULDPEs, and any LLDPE can be any of those disclosed above in connection with the descriptions of the corresponding layers. In this structure, the high density composition in the A layers (the first and second layers) is believed to provide high stiffness with low tear strength, while the inclusion of ULDPE in the A layers (the first and second layers) is believed to provide surface tackiness to help the film stick to the rolls during orientation and to prevent neck-in in the cross direction during high machine direction orientation. The ULDPE or combination of ULDPE and LLDPE in the B layer (the inner layer) is believed to provide high tear resistance. For a collapsed film having a combination of high stiffness and high tear resistance, a uniaxially oriented film having an A/B/C/C/B/A structure may comprise the same A layer (the first layer). The B layer (an inner layer between the first layer and second layer) can comprise 70% by weight of the layer of a Ziegler-Natta catalyzed ULDPE and 30% by weight of a single-site catalyzed HDPE, and a C layer (a second layer) comprising 100% by weight of a Ziegler-Natta catalyzed ULDPE. The Ziegler-Natta catalyzed ULDPE can be any of those disclosed above in connection with the descriptions of the corresponding layers. In this structure, the HDPE/ULDPE combination in the B layer is believed to provide high tear resistance with toughness, and the ULDPE in the C layer also provides high tear resistance and toughness while also providing adhesion during collapsing of the film.

As another example, some embodiments relate to uniaxially oriented films that provide good stiffness, high tear resistance, and high sealability. For a non-collapsed film, a uniaxially oriented film having an A/B/C structure may comprise an A layer (the first layer) having 70% by weight of the layer of a first composition comprising an ethylene-based polymer prepared in the presence of a single-site catalyst having a density of 0.935 to 0.965 $g/cm^3$ and 30% by weight of the layer of a Ziegler-Natta catalyzed ULDPE, a B layer (an inner layer) comprising either 100% of a Ziegler-Natta catalyzed ULDPE or blends of such a ULDPE with a LLDPE, and a C layer (the second layer) having 60% by weight of the layer of a polyolefin plastomer and 40% by weight of the layer of a metallocene catalyzed LLDPE. The first composition, the Ziegler-Natta catalyzed ULDPEs, the LLDPEs, and the polyolefin plastomer can be any of those disclosed above in connection with the descriptions of the corresponding layers. In this structure, the high density composition in the A layer (the first and second layers) is believed to provide high stiffness with low tear strength, while the inclusion of ULDPE in the A layer (the first and second layers) is believed to provide surface tackiness to help the film stick to the rolls during orientation and to prevent neck-in in the cross direction during high machine direction orientation. The ULDPE or combination of ULDPE and LLDPE in the B layer (the inner layer) is believed to provide high tear resistance. The combination of polyolefin plastomer and metallocene catalyzed LLDPE in the C layer is believed to provide high sealability.

Articles

Embodiments of the present invention also provide articles formed from any of the uniaxially oriented films described herein. Examples of such articles can include flexible packages, pouches, stand-up pouches, and pre-made packages or pouches. Such articles can be formed using techniques known to those of skill in the art in view of the teachings herein.

For example, thin gauge (e.g., 25-35 micron), single films having very good optics, stiffness, and sealability, according to some embodiments of the present invention, can be useful in pouches made with form/fill/seal processing equipment. Such pouches can useful for powder and grain pouches holding ~250 grams to 1 kilogram. The orientation of the films of the present invention in the machine direction is believed to provide a combination of stiffness, toughness, and optics that is advantageous over conventional blown films.

Uniaxially oriented films having high stiffness and clarity, according to some embodiments of the present invention, can be laminated to one another to provide a laminate formed entirely from polyethylene. As another example, a uniaxially oriented film having high stiffness and clarity, according to some embodiments of the present invention, can be laminated to a stiff, HDPE-rich blown film, and the laminate can be used to form a stand-up pouch formed entirely from polyethylene.

As another example, uniaxially oriented films having high stiffness, high optics, and good tear strength, in some embodiments can be used as a film for candy wrap applications.

Some embodiments of the invention will now be described in detail in the following Examples.

EXAMPLES

Several blown film structures are developed for off-line orientation in the machine direction.

Example 1

Table 1 shows the film structure for Example 1. Example 1 has an A/B/A film structure with a stiff core layer provided by an enhanced polyethylene having a high density ("EPE-HD"), and softer and tackier skin layers obtained by blending a Ziegler-Natta catalyzed ULDPE ("Z-N ULDPE") with the HDPE.

Example 1

TABLE 1

| Layer | Composition | Layer Density | % of Film Thickness |
|---|---|---|---|
| A (First Layer) | 70% EPE-HD; 30% Z-N ULDPE | 0.944 | 25% |

TABLE 1-continued

| Layer | Composition | Layer Density | % of Film Thickness |
|---|---|---|---|
| B (Inner Layer) | EPE-HD | 0.961 | 50% |
| A (Second Layer) | 70% EPE-HD; 30% Z-N ULDPE | 0.944 | 25% |

The EPE-HD is ELITE™ 5960G, which is an enhanced polyethylene resin having a density of 0.9580-0.9650 g/cm³ and a melt index ($I_2$) of 0.7-1.0 g/10 minutes, and is commercially available from The Dow Chemical Company. The Z-N ULDPE is ATTANE™ 4203 having a density of 09030-0.9070 g/cm³ and a melt index ($I_2$) of 0.7-0.9 g/10 minutes, which is commercially available from The Dow Chemical Company.

The coextruded A/B/A film structure of Example 1 is produced at 115 microns on a 3-layer blown film line run by using the layers set forth above. One of the A layers is the outside layer of the bubble while the other A layer is the inner layer of the bubble. The B layer is encapsulated between the two A layers. The blow up ratio used is 2.5:1. The standard frost line height is 30 centimeters. The layer distribution used is 25/50/25. The film of Example 1 has an overall density of 0.953 g/cm³, and an initial thickness of ~114 microns.

Films according to Example 1 are stretched at 235° F. and at draw ratios of 4.8:1 and 6.2:1 to obtain 27.7 and 21.1 micron thick films as shown in Table 2:

Example 1

TABLE 2

| Layer | Composition | Thickness (μ) | 4.8:1 Draw Ratio (μ) | 6.2:1 Draw Ratio (μ) |
|---|---|---|---|---|
| A (First Layer) | 70% EPE-HD; 30% Z-N ULDPE | 28.38 | 6.92 | 5.27 |
| B (Inner Layer) | EPE-HD | 56.77 | 13.84 | 10.54 |
| A (Second Layer) | 70% EPE-HD; 30% Z-N ULDPE | 28.38 | 6.92 | 5.27 |
| | Total Thickness | 113.54 | 27.69 | 21.08 |

Both films are substantially flat and are quite stiff with the 21 micron film having lower haze and higher gloss. Measurements are taken to evaluate the Example 1 films orientation performance. The 21 micron Example 1 film had an initial roll width of 1400 mm, a roll width after orientation in the machine direction of 1180 mm, and a final roll width after edge trimming of 1040 mm. These values represent a width retraction after orientation in the machine direction of 15.71%, and a total width reduction of 25.71% after additional trimming of slightly thicker film edges after orientation.

Example 2

Table 3 shows the film structure for Example 2. Example 2 also has an A/B/A film structure and includes the same EPE-HD and Z-N ULDPE as Example 1. In Example 2, the EPE-HD, which provided the stiff core in Example 1, is replaced with the Z-N ULDPE.

Example 2

TABLE 3

| Layer | Composition | Layer Density | % of Film Thickness |
|---|---|---|---|
| A (First Layer) | 70% EPE-HD; 30% Z-N ULDPE | 0.944 | 25% |
| B (Inner Layer) | Z-N ULDPE | 0.905 | 50% |
| A (Second Layer) | 70% EPE-HD; 30% Z-N ULDPE | 0.944 | 25% |

The coextruded A/B/A film structure of Example 2 is produced at 115 microns on a 3-layer blown film line run by using the layers set forth above. One of the A layers is the outside layer of the bubble while the other A layer is the inner layer of the bubble. The B layer is encapsulated between the two A layers. The blow up ratio used is 2.5:1. The standard frost line height is 30 centimeters. The layer distribution used is 25/50/25. The film of Example 2 has an overall density of 0.925 g/cm³, and an initial thickness of ~118 microns.

A film similar to Example 2 is also prepared except that one of the A layers in Example 2 is replaced with a C layer comprising an enhanced polyethylene resin. The enhanced polyethylene resin is ELITE™ 5401G having a density of 0.918 g/cm³ and a melt index ($I_2$) of 1.0 g/10 minutes, which is commercially available from The Dow Chemical Company. When this film is oriented in the machine direction at a draw ratio of 8:1, the film exhibits uncontrollable curling.

Films according to Example 2 are stretched at 235° F. and at draw ratios of 6.2:1, 8.3:1, and 9.1:1 to obtain the film thicknesses shown in Table 4:

Example 2

TABLE 4

| Layer | Composition | Thickness (μ) | 6.2:1 Draw Ratio (μ) | 8.3:1 Draw Ratio (μ) | 9.1:1 Draw Ratio (μ) |
|---|---|---|---|---|---|
| A (First Layer) | 70% EPE-HD; 30% Z-N ULDPE | 29.53 | 5.46 | 4.06 | 3.94 |
| B (Inner Layer) | Z-N ULDPE | 59.06 | 10.92 | 8.13 | 7.89 |
| A (Second Layer) | 70% EPE-HD; 30% Z-N ULDPE | 29.53 | 5.46 | 4.06 | 3.94 |
| | Total Thickness | 118.11 | 21.84 | 16.26 | 15.77 |

Measurements are taken to evaluate the Example 2 films orientation performance. The 16.26 micron Example 2 film has an initial roll width of 1400 mm, a roll width after orientation in the machine direction of 1200 mm, and a final roll width after edge trimming of 1050 mm. These values represent a width retraction after orientation in the machine direction of 14.29%, and a total width reduction of 25.00% after additional film edge trimming to remove the slightly thicker edges.

Figure 1:
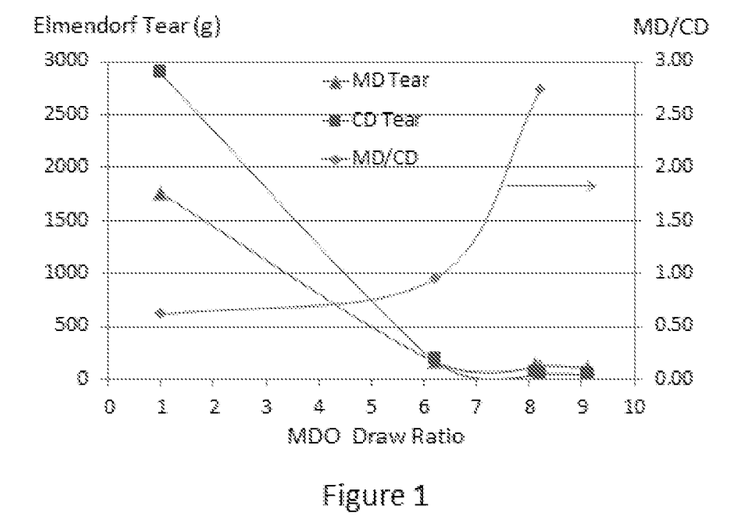
FIG. 1 is a chart showing the results of Elmendorf tear tests in the Examples.
Figure 2:
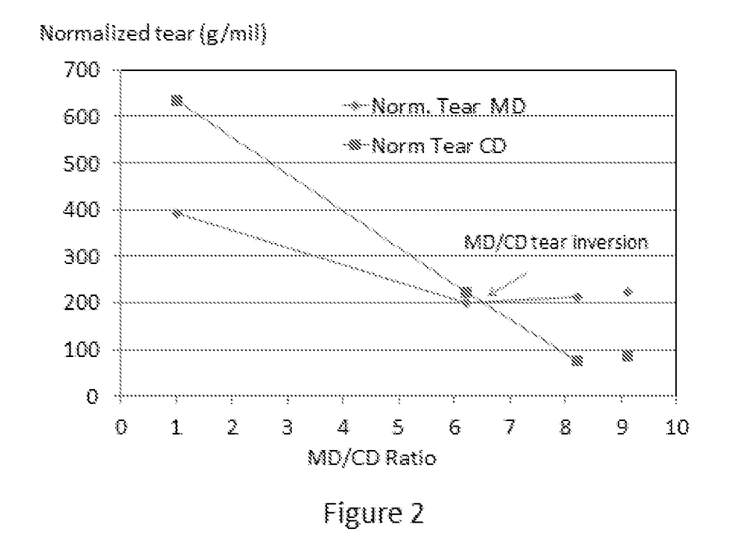
FIG. 2 is another chart showing the results of Elmendorf tear tests in the Examples.

The Example 2 films are measured for Elmendorf tear according to ASTM D1922. FIG. 1 plots the Elmendorf tear values for the machine direction ("MD") and the cross direction ("CD"), as well as the MD/CD ratio of the Elmendorf tear values, versus draw ratio for the machine direction orientation. FIG. 2 plots the normalized Elmendorf tear values (Elmendorf tear value/film thickness, grams/mil) versus draw ratio for the machine direction orientation. The Elmendorf tear values are desirable for certain applications. The films exhibit unexpectedly good Elmendorf tear retention after machine direction orientation draw ratios of 8:1 and higher. One might expect Elmendorf tear values in the machine direction to drop significantly below Elmendorf tear values in the cross direction upon increasing the draw ratio in the machine direction. As shown in FIGS. 1 and 2, for the Example 2 films, the MD and CD Elmendorf tear values equalize at a draw ratio of about 6:1, and the MD Elmendorf tear values become higher as the draw ratio increases.

Figure 3:
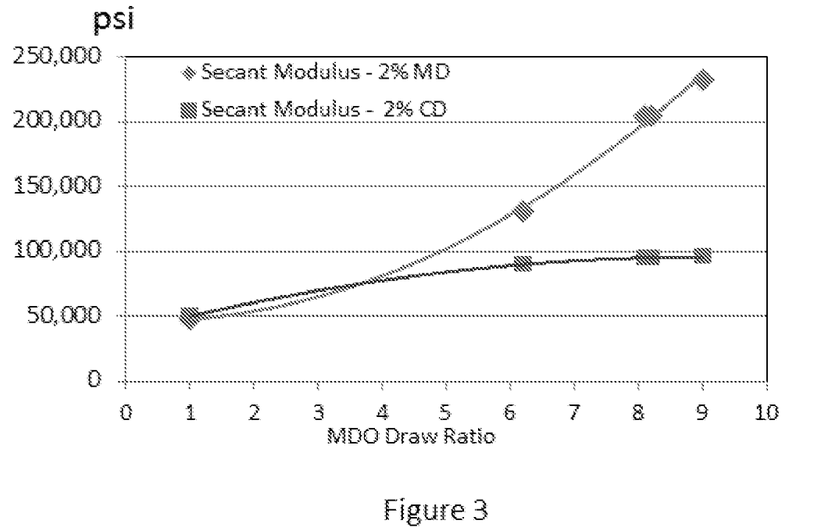
FIG. 3 is a chart showing the results of 2% secant modulus tests in the Examples.

The Example 2 films are also measured for 2% secant modulus in the machine direction ("MD") and the cross direction ("CD") in accordance with ASTM D882. The results are shown in FIG. 3. As shown in FIG. 3, the 2% MD secant modulus increases by a factor of four from the non-oriented thick film value of ~50,000 psi to over 200,000 psi at an 8:1 draw ratio in the MD. The 2% CD secant modulus also almost doubles, indicating a MD/CD 2% sec modulus ratio of 2:1.

Figure 4:
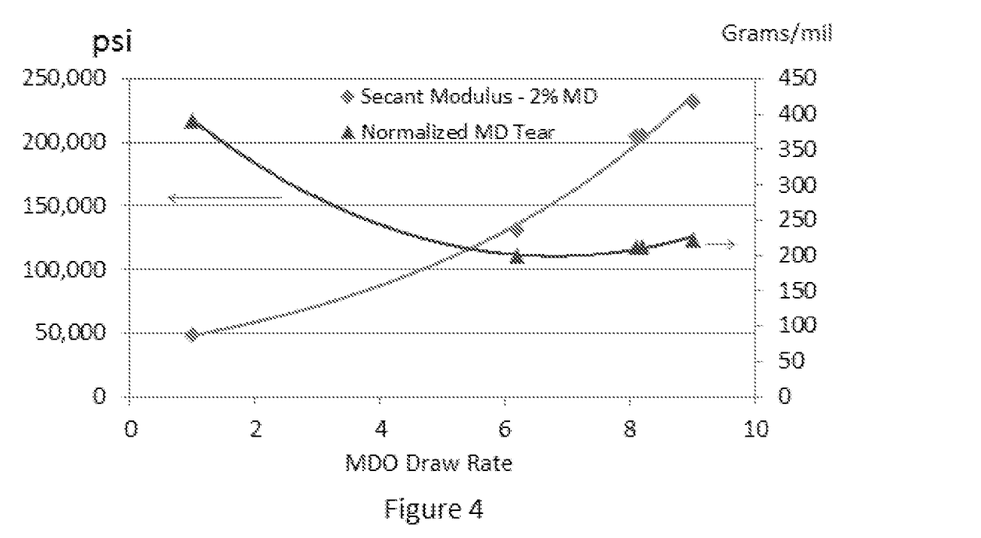
FIG. 4 is a chart showing the relationship between Elmendorf tear and 2% secant modulus from the tests in the Examples.
Figure 5:
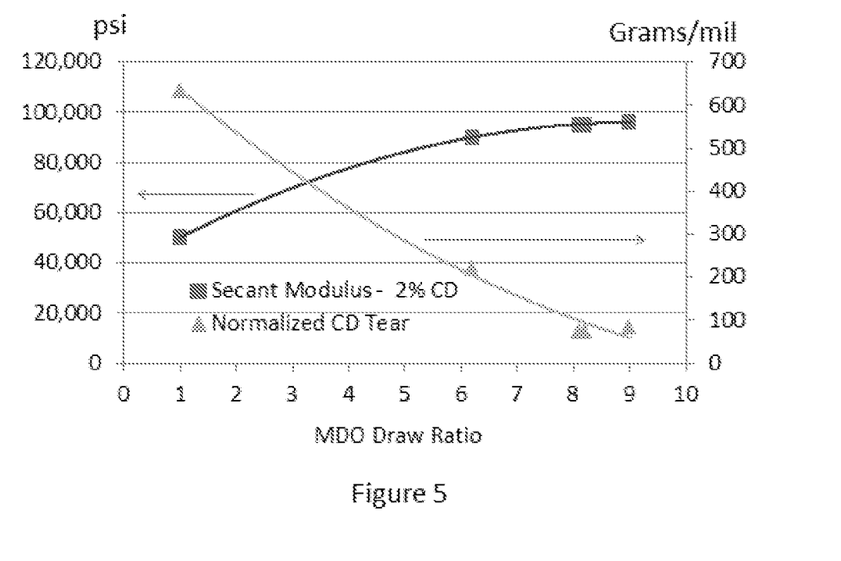
FIG. 5 is another chart showing the relationship between Elmendorf tear and 2% secant modulus from the tests in the Examples.
Figure 6:
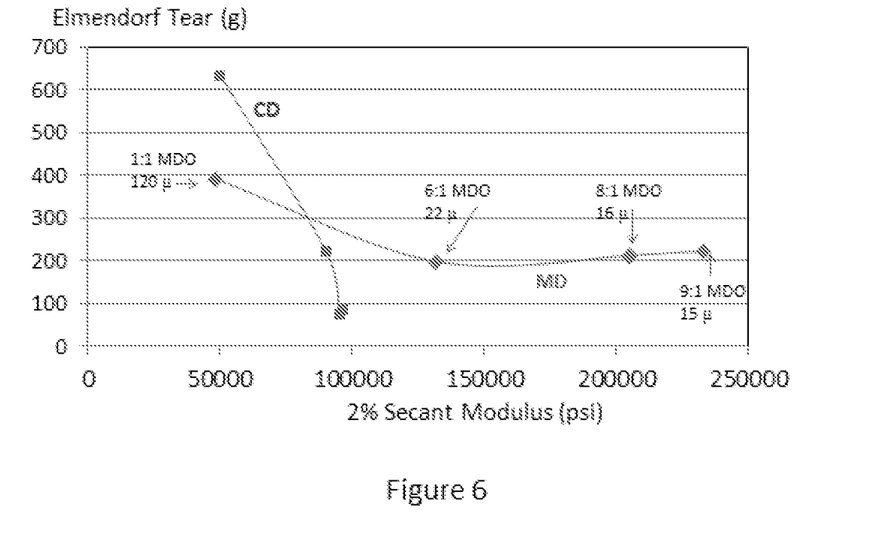
FIG. 6 is a chart showing the relationship between normalized Elmendorf tear values and 2% secant modulus values from the tests in the Examples.

FIGS. 4 and 5 show the interrelationship between normalized Elmendorf tear (grams/mil) and 2% secant modulus for the MD and CD, respectively. In the MD, the 2% secant modulus values increase at increasing draw ratios while the Elmendorf tear values decrease before seeming to plateau at draw ratios above 6:1. In the CD, the 2% secant modulus values also increase with increasing draw ratios, though at a lesser rate than the MD, while the Elmendorf tear values decrease with increasing draw ratios. Similarly, FIG. 6 compares normalized Elmendorf tear values (grams/mil) to the 2% secant modulus values. As shown in FIG. 6, at a draw ratio of 6:1 in the MD, the film reaches a 2% secant modulus of ~180,000 psi. As the film is stretched to draw ratios of 8:1 and 9:1, the normalized Elmendorf tear in the MD is maintained while the film gauge decreases from ~22 microns to ~15 microns, while the 2% secant modulus in the MD increases to ~250,000 psi. Of particular note, the ~15 micron film, oriented in the machine direction at a draw ratio of 9:1, advantageously exhibits a 2% secant modulus in the MD of ~250,000 psi and a normalized Elmendorf tear of ~223 g/mil.

Example 3

Example 3 is an example of a uniaxially oriented film formed by collapsing an A/B/C structure film to form a six layer film having an A/B/C/C/B/A structure. The film includes the same EPE-HD and Z-N ULDPE as Example 1. The A layers comprise an enhanced polyethylene resin ("EPE"). The EPE is ELITE™ 5401G having a density of 0.917 g/cm³ and a melt index ($I_2$) of 1.0 g/10 minutes, which is commercially available from The Dow Chemical Company. Table 5 provides the formulation for Example 3:

Example 3

TABLE 5

| Layer | Composition | Layer Density | % of Film Thickness |
|---|---|---|---|
| A (First Layer) | 100% EPE | 0.917 | 20.0% |
| B (Inner Layer) | 70% EPE-HD; 30% Z-N ULDPE | 0.9442 | 12.5% |
| C (Second Layer) | 100% Z-N ULDPE | 0.905 | 17.5% |
| C | 100% Z-N ULDPE | 0.905 | 17.5% |

TABLE 5-continued

| Layer | Composition | Layer Density | % of Film Thickness |
|---|---|---|---|
| B | 70% EPE-HD; 30% Z-N ULDPE | 0.9442 | 12.5% |
| A | 100% EPE | 0.917 | 20.0% |

An A/B/C coextruded film structure using the layers set forth in Table 5 is produced at 115 microns on a 3-layer blown film line. The A layer is the outside layer of the bubble while the C layer is the inner layer of the bubble. The B layer is encapsulated between the A layer and the C layer. The blow up ratio used is 2.5:1. The standard frost line height is 30 centimeters. The layer distribution used is 25/50/25. The film of Example 3 has an overall density of 0.9196 g/cm³. The C layer is a Ziegler-Natta catalyzed ULDPE resin with a VICAT softening point of 84° C. and peak melting point of 123° C., which promotes collapsing of the bubble to form the A/B/C/C/B/A film structure. The blown film has a thickness of ~100 microns, but is allowed to collapse to heat laminate the ULDPEs in its C layer to form a ~200 micron film.

Films according to Example 3 are stretched at 225° F. and at a draw ratio of 7.1:1 to obtain the film thicknesses shown in Table 6:

Example 3

TABLE 6

| Layer | Composition | Thickness (μ) | 7.1:1 Draw Ratio (μ) |
|---|---|---|---|
| A (First Layer) | 100% EPE | 40 | 6.1 |
| B (Inner Layer) | 70% EPE-HD; 30% Z-N ULDPE | 25 | 3.8 |
| C (Second Layer) | 100% Z-N ULDPE | 35 | 5.3 |
| C | 100% Z-N ULDPE | 35 | 5.3 |
| B | 70% EPE-HD; 30% Z-N ULDPE | 25 | 3.8 |
| A | 100% EPE | 40 | 6.1 |
| Total Thickness | | 200 | 30.5 |

The Example 3 film stretches easily at 225° F., and is substantially flat. The film also shows excellent optical properties. Measurements are taken to evaluate the Example 3 film's orientation performance The Example 3 film had an initial roll width of 1600 mm, a roll width after 7:1 orientation in the machine direction of 1430 mm, and a final roll width after edge trimming of 1260 mm. These values represent a width retraction after orientation in the machine direction of 10.63%, and a total width reduction of 21.25% after edge trimming.

The invention claimed is:
1. A uniaxially oriented film comprising:
(a) a first layer comprising (i) a first composition comprising an ethylene-based polymer prepared in the presence of a single-site catalyst, wherein the first composition has a density of 0.940 g/cm³ to 0.965 g/cm³, a melt index ($I_2$) of 0.5 to 6 g/10 minutes, and a MWD of 6.0 or less, and (ii) a Ziegler-Natta catalyzed ultra low density polyethylene having a density of 0.880 g/cm³ to 0.912 g/cm³, a melt index ($I_2$) of 0.5 to 6 g/10 minutes, and a MWD of 6.0 or less, wherein the first layer comprises more than 0% by weight and less than 40% by weight of the Ziegler-Natta catalyzed ultra low density polyethylene;

(b) a second layer comprising at least one polyolefin; and (c) at least one inner layer between the first layer and the second layer comprising a high density polyethylene, wherein the film is oriented in the machine direction at a draw ratio of between 4:1 and 10:1, and wherein the film exhibits a machine direction 2% secant modulus of 85,000 psi or more when measured as per ASTM D882.

2. The uniaxially oriented film of claim 1, wherein the first composition further comprises an ethylene-based polymer prepared in the presence of a Ziegler-Natta catalyst.

3. The uniaxially oriented film of claim 1, wherein the at least one polyolefin in the second layer comprises one of the following:

(a) (i) a third composition comprising an ethylene-based polymer prepared in the presence of a single-site catalyst, wherein the third composition has a density of 0.935 g/cm$^3$ to 0.965 g/cm$^3$, a melt index (I$_2$) of 0.5 to 6 g/10 minutes, and a MWD of 6.0 or less, and (ii) a Ziegler-Natta catalyzed ultra low density polyethylene having a density of 0.880 g/cm$^3$ to 0.912 g/cm$^3$, a melt index (I$_2$) of 0.5 to 6 g/10 minutes, and a MWD of 6.0 or less; or (b) a Ziegler-Natta catalyzed ultra low density polyethylene having a density of 0.880 g/cm$^3$ to 0.912 g/cm$^3$ and a melt index (I$_2$) of 0.5 to 6 g/10 minutes, and a metallocene catalyzed linear low density polyethylene having a density of 0.912 g/cm$^3$ to 0.935 g/cm$^3$ and a melt index (I$_2$) of 0.5 to 6 g/10 minutes; or (c) a Ziegler-Natta catalyzed ultra low density polyethylene having a density of 0.880 g/cm$^3$ to 0.912 g/cm$^3$ and a melt index (I$_2$) of 0.5 to 6 g/10 minutes, and a polyolefin plastomer; or (d) 100% by weight of a Ziegler-Natta catalyzed ultra low density polyethylene having a density of 0.880 g/cm$^3$ to 0.912 g/cm$^3$ and a melt index (I$_2$) of 0.5 to 6 g/10 minutes; or (e) 100% by weight of a metallocene catalyzed linear low density polyethylene having a density of 0.912 g/cm$^3$ to 0.935 g/cm$^3$ and a melt index (I$_2$) of 0.5 to 6 g/10 minutes; or (f) 100% by weight of a polyolefin plastomer having a density of 0.865 g/cm$^3$ to 0.908 g/cm$^3$ and a melt index (I$_2$) of 0.5 to 6 g/10 minutes; or (g) a metallocene catalyzed linear low density polyethylene having a density of 0.912 g/cm$^3$ to 0.935 g/cm$^3$ and a melt index (I$_2$) of 0.5 to 6 g/10 minutes, and a polyolefin plastomer.

4. The uniaxially oriented film of claim 1, wherein the ultra low density polyethylene in the first layer has a peak melting point of 100° C. or more and a VICAT softening point of 100° C. or less.

5. A food package comprising the uniaxially oriented film of claim 1.

6. A laminate comprising a first uniaxially oriented film according to claim 1 and a second uniaxially oriented film according to claim 1, wherein the first layers of the first and second uniaxially oriented films are outer layers, wherein the second layers of the first and second uniaxially oriented films are sealed to each other, and wherein the first uniaxially oriented film and the second uniaxially oriented film are formed from a single blown film.

* * * * *